United States Patent [19]

Volleau et al.

[11] Patent Number: 4,460,252

[45] Date of Patent: Jul. 17, 1984

[54] ELECTRICALLY CONTROLLED OPTICAL DEFLECTOR

[75] Inventors: Patrick Volleau; Michel Chaboche; Claude Bricot, all of Paris, France

[73] Assignee: Thomson-CSF, Paris, France

[21] Appl. No.: 285,565

[22] Filed: Jul. 21, 1981

[30] Foreign Application Priority Data

Jul. 22, 1980 [FR] France .................. 80 16129

[51] Int. Cl.³ .......................................... G02B 27/17
[52] U.S. Cl. ........................................................ 350/486
[58] Field of Search ............................................. 350/486

[56] References Cited

U.S. PATENT DOCUMENTS

| | | | |
|---|---|---|---|
| 2,461,190 | 2/1949 | Wolff, Jr. ...................... | 248/479 |
| 3,349,174 | 10/1967 | Warschauer .................. | 350/486 |
| 3,407,018 | 10/1968 | Miller .......................... | 350/321 |
| 4,021,096 | 5/1977 | Dragt ........................... | 350/486 |

FOREIGN PATENT DOCUMENTS

| | | |
|---|---|---|
| 2285626 | 4/1976 | France . |
| 2328977 | 5/1977 | France . |
| 2278112 | 1/1978 | France . |
| 2378329 | 8/1978 | France . |

Primary Examiner—John K. Corbin
Assistant Examiner—Rebecca D. Gass
Attorney, Agent, or Firm—Oblon, Fisher, Spivak, McClelland & Maier

[57] ABSTRACT

This invention concerns electrically controlled optical deflectors, and more specifically an optical deflector comprising a mirror forming part of an assembly which cam move in relation to a fixed base, the pivotal movements of this assembly being controlled by an electrodynamic motor with a winding through which a variable current passes, and which is situated inside a predetermined magnetic field, the mechanical connection between the movable assembly and the fixed base being provided by a prismatic elastic component.

This invention applies in particular to the construction of reading heads to direct an optical beam on to a videodisc track.

6 Claims, 5 Drawing Figures

4,460,252

ELECTRICALLY CONTROLLED OPTICAL DEFLECTOR

BACKGROUND OF THE INVENTION

This invention applies to the area of optics involving remote control of the deflection of a light beam, more specifically videodisc track-following devices. It concerns an electrically controlled optical deflector.

Such devices are in common use. One of them, for example, is described in French Pat. No. 74 243 68, granted on Jan. 16, 1978: an electrically controlled deflector system comprising a movable mirror assembly actuated by an electrodynamic motor.

In this device, which comprises a fixed base and a movable assembly with a mirror, the assembly is suspended at two points from supporting components on the base, by means of a pencil-shaped component, which passes through the assembly from one end to the other, through a passage provided for the purpose, and the ends of which are attached to the two supporting points. The assembly rotates on the axis formed by this component.

The electrodynamic motor used to make the movable assembly rotate comprises an electrical winding attached to the assembly, and a double magnetic circuit, which creates two magnetic fields within which two opposite sides of the winding are situated. Whenever a current passes through the winding, these two opposite sides are subjected to a couple, which causes the movable assembly to rotate. The double magnetic circuit is created by two permanent magnets on the fixed base, equipped with pole pieces forming magnetic air gaps.

One feature of this system is that the component forming the rotational axis is elastic, and is mechanically integral with the movable assembly through the whole length of the passage in the assembly, and with the supporting points to which it is attached, consisting of appropriate apertures. The couple produced by the electrodynamic motor twists the two portions of this elastic component between the movable assembly and the two supporting points. The component is rendered integral by the simple procedure of inserting it in the various openings while under tension, then releasing such tension, with the result that the component expands, filling all the volume of the passage and supporting point holes.

This elastic component performs three functions: firstly, it forms the axis of rotation of the movable assembly, through its torsional capacity; secondly, it provides a mechanical connection, by suspension between two points, between the movable assembly and the base; and thirdly, it exerts a restoring force on the movable assembly when subjected to the electrodynamic torque, this being necessary in order to immobilize the mirror in a specific position. The type of material and tension of the elastic component are therefore vital factors in obtaining optimum damping of oscillations of the movable assembly.

Although it is quite possible to define and reproduce the type of material used for the elastic component, it is difficult during construction to reproduce accurately the same degree of tension, with the result that individual devices may not all function identically.

In addition, such a system is liable to interference from oscillations caused by elongation of the elastic component following on impact.

This invention overcomes these drawbacks by modifying the structure of the optical deflector, while retaining the benefits offered by the elasticity of the connection between movable assembly and base, for damping oscillations.

SUMMARY OF THE INVENTION

In this new optical deflector, the movable assembly, instead of being suspended from the base, is placed on one surface of the base, the two being separated by a prismatic elastic component with two parallel supporting surfaces, one resting on the surface of the base, the other carrying the movable mirror.

This new electrically controlled optical deflector comprises a fixed base, magnetic inductor devices, a mirror supported by a movable assembly, at least one winding, and a prismatic elastic component with two parallel supporting surfaces, one fixed to the base, and the other fixed along the centre-line of the underside of the mirror, the deflector being characterized by the fact that the inductor devices are integral with the fixed base, and create a predetermined magnetic field inside two parallel air gaps that the winding is constructed on a rectangular frame fixed to the movable assembly, symmetrically in relation to the centre-line, and that two opposite sides of this winding are situated within the air gaps.

One embodiment of the invention comprises another modification, designed to simplify construction and thereby reduce the weight and price of such a deflector, intended to be used on the reading head on a carriage capable of a movement of translation, to enable the optical reading beam to follow the recording track on a disc. In this embodiment, the pair of magnetic circuits, each containing a magnet, and two heavy, cumbersome polar pieces, is replaced by three ferrite blocks aligned on the fixed base in such a way as to leave two air gaps containing two magnetic fields acting in the same direction.

BRIEF DESCRIPTION OF THE DRAWINGS

The invention will be made clearer by the following description, with reference to the accompanying illustrations.

DETAILED DESCRIPTION OF THE PREFERRED EMBODIMENT

In ways known in the prior art, this new optical deflector basically comprises a fixed base, a mirror fixed to an assembly which is movable in relation to the base, and an electrodynamic motor, controlled by an electric current.

The principal characteristic feature of this invention concerns the means of support provided between the movable assembly and the fixed base. In the prior art, this assembly with the mirror is suspended from the base at two points, by a pencil-shaped elastic component, which can rotate by twisting.

Figure 1:
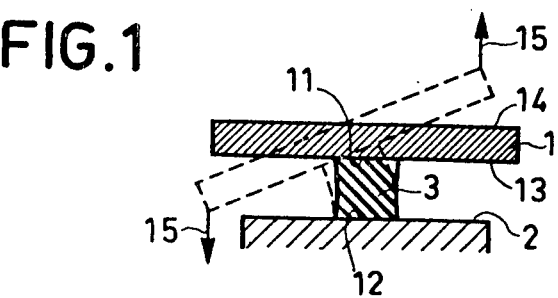
FIG. 1, showing, in the diagrammatical form, how the elastic component functions.

In this new deflector, as illustrated in FIG. 1, the movable assembly 1 to which the mirror is fixed (and which in one embodiment consists of the mirror itself) rests on one surface 2 of the fixed base, the two being separated by a prismatic elastic component 3, the centre-line of which is the axis on which the movable assembly pivots. The prism-shaped component may be made of rubber, and it possesses two parallel supporting surfaces 11 and 12. The upper surface 11 is glued to the underside 13 of the movable assembly 1, and the lower surface 12 is glued to the surface 2 of the fixed base. The movable assembly 1 is positioned approximately symmetrically on the elastic component 3, so that, in the absence of any electrodynamic forces, it is balanced on the base.

The electrodynamic motor (not shown here) which actuates this deflector produces a couple of forces on the movable assembly 1, acting in the direction shown by the arrows 15. Under the effect of these forces, the movable assembly pivots into the position shown by the dotted line, bending and thereby deforming the elastic component 3 which exerts a restoring force on the assembly, tending to bring it back to its original position.

In fact, because of deformation of the elastic component 3, the movable assembly does not turn on a clearly defined rotational axis. Its movements are equivalent to rotation and translation, which does not raise any problem in cases where the device is used on conjunction with a parallel light beam.

Definition of the movement can be increased, and it can be made much more equivalent to rotation, by narrowing the elastic component lengthwise, parallel to the supporting surfaces. When a couple of forces pivots the movable assembly, such a component will tend to bend more on the zone of least mechanical strength, namely in the narrowed-down part. If narrow enough, this may be regarded as an axis of rotation.

Figure 2:
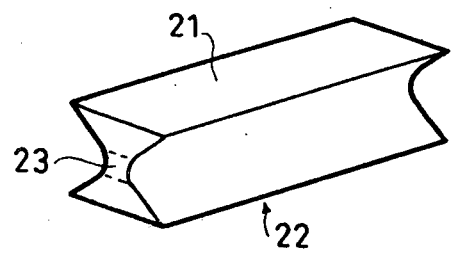
FIG. 2, showing one embodiment of this component.

FIG. 2 illustrates such a component, consisting of a prism with an X-shaped cross section, and two parallel surfaces, one 21 of which may be glued to the movable assembly, while the other 22 may be glued to the fixed base.

The narrow part 23 of this X-shaped cross section, bounded arbitrarily by dotted lines, constitutes the virtual rotational axis of the device.

This component may be made, for example, from a rubber material such as a copolymer of isobutylene and isoprene, and its dimensions depend on the size of the mirror, to suit the application involved. In a videodisc reading head, for example, in which the mirror is approximately 10 mm square, the component is approximately 8 mm long, and a square with 1.2 mm sides would contain its cross section.

Figure 3:
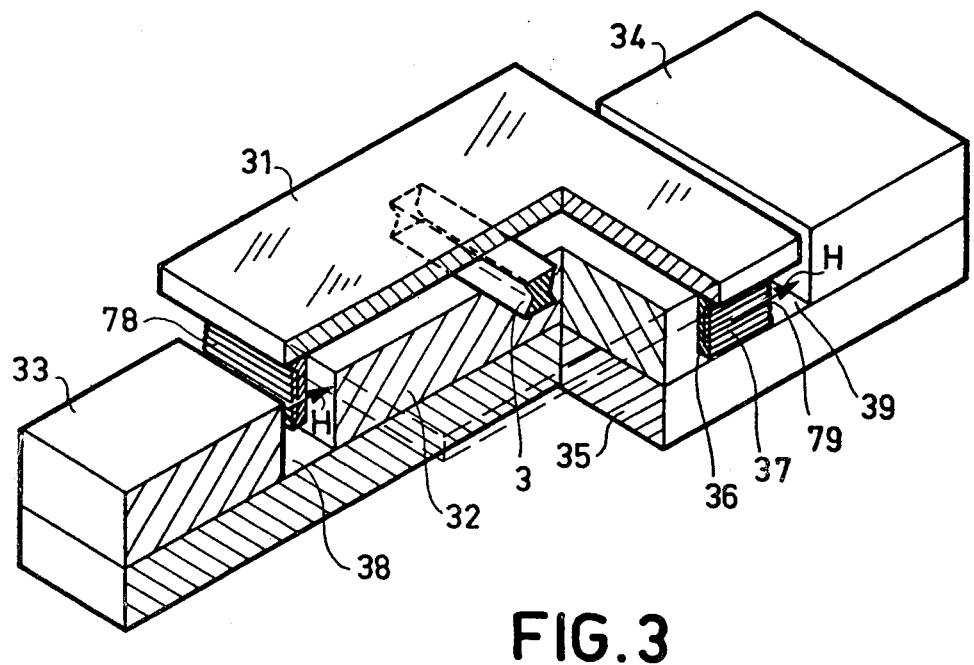
FIG. 3, showing a cut-away cross-sectional view of one embodiment of this new optical deflector.

FIG. 3 shows an embodiment of this new optical deflector, comprising an X-shaped elastic component, and formed of a movable assembly connected to a fixed base by means of this component.

In this embodiment, the movable assembly 31 consists of the actual mirror, to the underside of which is glued a frame 36 for a winding 37. The mirror is rectangular, and the frame is also rectangular, being slightly somewhat smaller in dimensions than the mirror.

The fixed part of the deflector comprises a base 35, on which are placed three ferrite blocks 32, 33 and 34. Between these are left two air gaps 38 and 39, parallel to the two sides of the mirror, and in which two identical magnetic fields are produced, acting in the direction indicated by the arrows H.

The mirror 31 is connected to the middle ferrite block 32, which acts as surface of the fixed base, by means of the prismatic rubber component 3, the upper surface 21 of which is glued to the underside of the mirror 31, and the lower surface 22 of which is glued to the topside of the ferrite block 32.

Two opposite sides 78 and 79 of the winding 37 are situated within the spaces 38 and 39 containing the permanent magnetic field H.

When the winding is supplied with electric current (I), these two opposite sides 78 and 79 are subjected to two forces of the same intensity, but acting in opposite directions. This causes the mirror 31 to pivot on the virtual axis formed by the narrow section of the elastic component 3, which exerts its own restoring force on the mirror, thereby immobilizing it in a position governed by the intensity of the electric current I. This allows orientation of the mirror to be remote-controlled. In a videodisc installation, a deflector of this kind is used for radial control of the optical beam on the recording track.

In another embodiment, this new optical deflector can also provide tangential control of the reading beam. For this purpose, it allows two directions of rotation at right angles to each other. This is obtained in a very simple way by superimposing, on the first movable assembly, a second assembly carrying the mirror, the two assemblies being connected by a second elastic prismatic component, placed perpendicular to the first.

Figure 4:
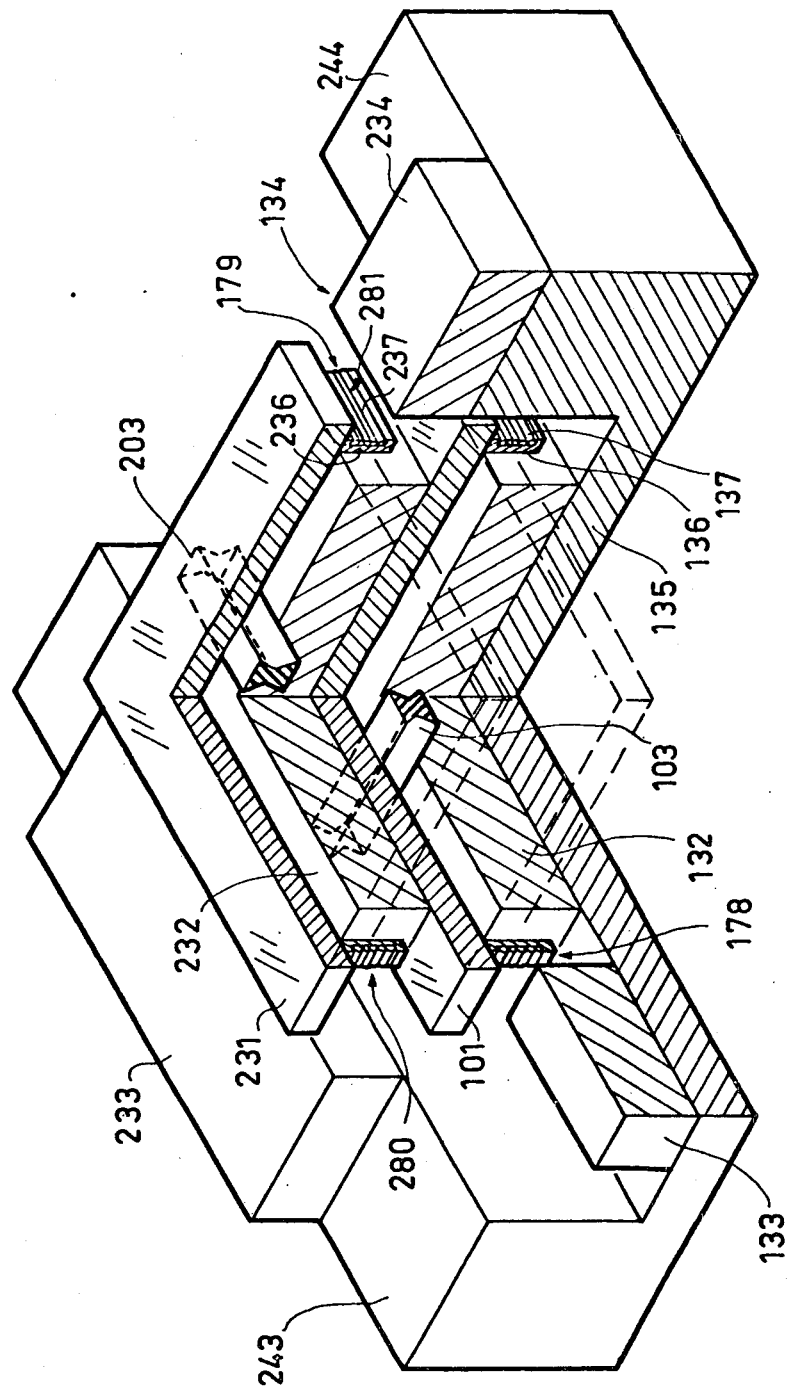
FIG. 4, showing a cut-away cross-sectional view of another embodiment of this new optical deflector.

FIG. 4 illustrates such a double-rotational device, comprising a base 135 and two superimposed movable assemblies; each equipped with the necessary electrodynamic motor.

The lower movable assembly, which pivots on the lower elastic component 103 comprises a plate 101 with a winding 137 on a frame 136 glued to the underside of this plate. Two opposite sides 178 and 179 of this winding 137 are situated within magnetic fields created in the air gaps left between three ferrite blocks 132, 133 and 134, parallel to the elastic component 103 and fixed to the base 135.

The underside of this elastic component 103 is glued to the middle ferrite block 132, and the topside to the underside of the lower movable assembly 101.

The upper movable assembly, which pivots on the upper elastic component 203 comprises a mirror 231, with a winding 237 on a frame 236 glued to the underside of this mirror. Two opposite sides 280 and 281 of this winding, at right angles to the sides 178 and 179 of the lower winding 137, are situated within magnetic fields created in the air gaps left between three ferrite blocks 232, 233 and 234.

The middle such block 232 is fixed to the lower movable assembly, while the outer two 233 and 234 are fixed to two raised edges 243 and 244 of the base 135, on the same level as the movable plate 101.

Orientation of the mirror 231 in a given position is controlled by the supply of current to the windings 137 and 237, which has the effect of causing it to pivot round the two perpendicular axes of rotation formed by the elastic components 103 and 203.

Figure 5:
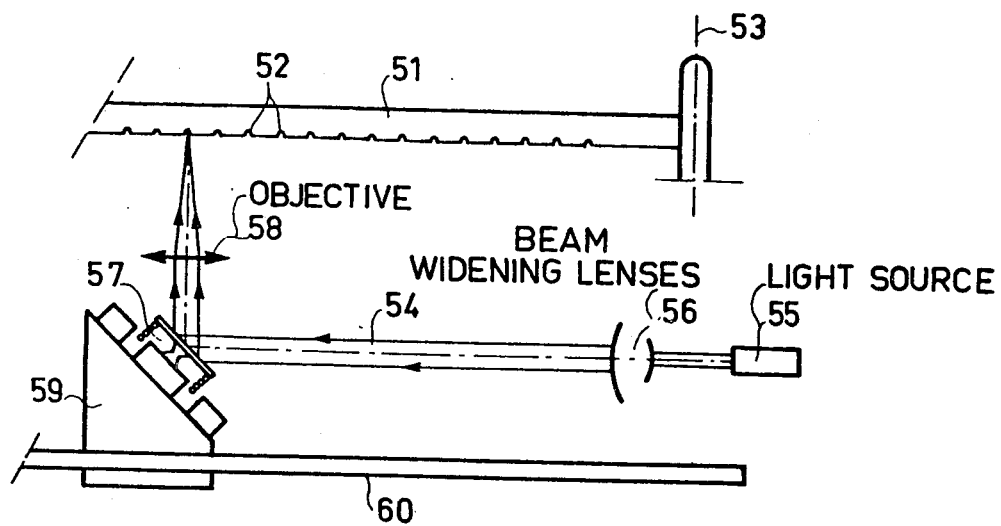
FIG. 5, showing how the device is used in practice.

This new optical deflector is used in particular in a videodisc reading system, as illustrated in FIG. 5. The disc 51, which contains a spiral track 52, revolves round the axis 53. A colliminated optical reading beam 54 emerges from a laser light source 55. After passing through widening lenses 56, this parallel beam 54 reaches the deflector 57, which directs it to the objective 58. This focuses it on a point on the disc.

The deflector 57 is attached to a carriage 59, which moves along a shaft 60, parallel to the radius of the disc, in order to follow the recording track.

Slight eccentricity of the disc, or a variation in the speed of rotation, could distort the radial and tangential position of the reading point at any time. The electrically controlled movements of the deflector mirror can be used to correct such an error.

What is claimed is:

1. An electrically controlled optical deflector, comprising:
    a fixed base;
    a prismatic elastic pivoting component, having two parallel supporting surfaces, mounted on said fixed base, one of said supporting surfaces being fixed to said base;
    a movable assembly including a mirror pivotably mounted to the other supporting surface of said pivoting component, said other supporting surface fixed along a center-line on an underside of said mirror;
    magnet inductor means mounted on said fixed base and including at least two air gaps for producing a magnetic field within said at least two air gaps; and
    a winding mounted on said movable assembly and having two opposite sides disposed in respective of said two air gaps.

2. A deflector as defined in claim 1, in which the cross section of the elastic component comprises a narrower lengthwise part.

3. A deflector as defined in claim 1, in which the cross section of the elastic component is X-shaped.

4. A deflector as defined in claim 1, in which the movable assembly is formed of two parts, each comprising a winding, the upper part further comprising a mirror and the lower part further comprising a magnetically conducting plate, wherein these parts and the base of the deflector are connected by two prismatic elastic components at right angles to each other, one such component connecting the base with the underside of the plate, and the other such component connecting the underside of the mirror with the topside of the plate, and fixed magnetic fields at right angles to each other are created in air gaps left between solid ferrite blocks, and the windings are situated within these air gaps.

5. A deflector as defined in claim 1, in which said magnetic inductor means comprise three parallelipiped-shaped ferrite blocks, aligned in such a way as to form two air gaps, containing magnetic fields acting in the same direction.

6. A deflector as defined in claim 5, in which the topside of the middle ferrite block forms the base for the prismatic elastic component.

* * * * *